United States Patent
Connell, II et al.

(10) Patent No.: US 9,899,025 B2
(45) Date of Patent: Feb. 20, 2018

(54) SPEECH RECOGNITION SYSTEM ADAPTATION BASED ON NON-ACOUSTIC ATTRIBUTES AND FACE SELECTION BASED ON MOUTH MOTION USING PIXEL INTENSITIES

(71) Applicant: International Business Machines Corporation, Armonk, NY (US)

(72) Inventors: Jonathan H. Connell, II, Cortlandt-Manor, NY (US); Etienne Marcheret, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 14/790,142

(22) Filed: Jul. 2, 2015

(65) Prior Publication Data

US 2016/0140964 A1 May 19, 2016

Related U.S. Application Data

(63) Continuation of application No. 14/540,554, filed on Nov. 13, 2014.

(51) Int. Cl.
*G10L 15/00* (2013.01)
*G05B 15/00* (2006.01)
(Continued)

(52) U.S. Cl.
CPC ............. *G10L 15/25* (2013.01); *G10L 15/07* (2013.01); *G06F 3/016* (2013.01);
(Continued)

(58) Field of Classification Search
CPC ............. G06N 3/008; G06K 9/00335; G06K 9/00281; G10L 15/25; H04R 25/40; G06F 3/016
(Continued)

(56) References Cited

U.S. PATENT DOCUMENTS 5,586,215 A  12/1996  Stork et al.
6,633,844 B1  10/2003  Verma et al.
(Continued)

FOREIGN PATENT DOCUMENTS

EP  0254409 A1  1/1988
EP  0254409 B1  1/1988

OTHER PUBLICATIONS

List of IBM Patents or Patent Applications Treated as Related.

*Primary Examiner* — Farzad Kazeminezhad
(74) *Attorney, Agent, or Firm* — Yeen Tham; Ryan, Mason & Lewis, LLP

(57) ABSTRACT

Non-acoustic data from a vicinity of speech input is obtained. A subject speaker is identified as the source of the speech input from the obtained non-acoustic data by detecting mouth motion on one or more faces segmented from the non-acoustic data by comparing a first pixel intensity associated at a first time with a second pixel intensity at a second time, and selecting a face corresponding to the subject speaker from the one or more faces in response to a determination that a number of significantly changed pixels between the first pixel intensity and the second pixel intensity exceeds a threshold. A demographic is assigned to the subject speaker based on an analysis of one or more non-acoustic attributes of the subject speaker extracted from the non-acoustic data. The speech input is processed using a speech recognition system adjusted using a model selected based on the demographic.

20 Claims, 4 Drawing Sheets

(51) Int. Cl.
*H04R 25/00* (2006.01)
*G06K 9/62* (2006.01)
*G10L 15/25* (2013.01)
*G10L 15/07* (2013.01)
*G06N 3/00* (2006.01)
*G06K 9/00* (2006.01)
*G06F 3/01* (2006.01)
*G10L 15/24* (2013.01)
*G10L 15/22* (2006.01)

(52) U.S. Cl.
CPC ......... *G06K 9/00281* (2013.01); *G06N 3/008* (2013.01); *G10L 15/24* (2013.01); *G10L 2015/227* (2013.01); *H04R 25/407* (2013.01)

(58) Field of Classification Search
USPC ........................................................ 704/231
See application file for complete search history.

(56) References Cited

U.S. PATENT DOCUMENTS

| | | | |
|---|---|---|---|
| 6,804,645 | B1 | 10/2004 | Kleinschmidt |
| 7,518,631 | B2 | 4/2009 | Hershey et al. |
| 7,835,908 | B2 | 11/2010 | Choi et al. |
| 8,150,107 | B2 | 4/2012 | Kurzweil et al. |
| 2002/0105575 | A1 | 8/2002 | Hinde et al. |
| 2004/0104702 | A1* | 6/2004 | Nakadai ............... B25J 13/00 318/568.12 |
| 2005/0283364 | A1 | 12/2005 | Longe et al. |
| 2008/0059175 | A1 | 3/2008 | Miyajima |
| 2008/0147404 | A1 | 6/2008 | Liu et al. |
| 2009/0018828 | A1 | 1/2009 | Nakadai et al. |
| 2009/0030552 | A1* | 1/2009 | Nakadai ................ G06N 3/008 700/258 |
| 2010/0146464 | A1 | 6/2010 | Wilson et al. |
| 2011/0019835 | A1 | 1/2011 | Schmidt et al. |
| 2011/0071830 | A1 | 3/2011 | Kim et al. |
| 2011/0224978 | A1 | 9/2011 | Sawada |
| 2011/0305384 | A1* | 12/2011 | Aoyama ............ G06K 9/00281 382/159 |
| 2011/0311144 | A1 | 12/2011 | Tardif |
| 2012/0163625 | A1* | 6/2012 | Siotis .................... H04R 3/005 381/92 |
| 2013/0054240 | A1 | 2/2013 | Jang et al. |
| 2013/0339027 | A1 | 12/2013 | Dokor et al. |
| 2014/0379346 | A1 | 12/2014 | Aleksic et al. |
| 2015/0172830 | A1* | 6/2015 | Liu ........................ H04R 25/40 381/313 |
| 2015/0235641 | A1 | 8/2015 | VanBlon et al. |
| 2015/0331490 | A1* | 11/2015 | Yamada ................. G06F 3/017 345/156 |
| 2015/0364139 | A1* | 12/2015 | Dimitriadis ........ G06K 9/00335 704/231 |
| 2016/0140955 | A1 | 5/2016 | Connell, II et al. |
| 2016/0140963 | A1 | 5/2016 | Connell, II et al. |

* cited by examiner

SPEECH RECOGNITION SYSTEM ADAPTATION BASED ON NON-ACOUSTIC ATTRIBUTES AND FACE SELECTION BASED ON MOUTH MOTION USING PIXEL INTENSITIES

CROSS-REFERENCE TO RELATED APPLICATION

This application is a Continuation of U.S. patent application Ser. No. 14/540,554, filed on Nov. 13, 2014, the disclosure of which is incorporated herein by reference in its entirety.

FIELD

The field relates generally to speech recognition and, more particularly, to techniques for adjusting a speech recognition system based on non-acoustic input.

BACKGROUND

Speech recognition is the translation of spoken words to text and, more particularly, it is the real-time computer-driven interpretation of spoken language or transcription into readable text. Speech recognition technology was initially developed to aid individuals in tasks where their hands were busy. It can also aid people with disabilities. For example, speech recognition systems could be helpful for people who are deaf or cannot operate a standard keyboard, such as those affected by cerebral palsy or even arthritis.

Speech recognition systems are rapidly increasing in significance in many areas of data and communications technology. In recent years, speech recognition has advanced to the point where it is used by millions of people across various applications. Speech recognition applications now include interactive voice response systems, voice dialing, data entry, dictation mode systems including medical transcription, automotive applications, etc. There are also "command and control" applications that utilize speech recognition for controlling tasks such as adjusting the climate control in a vehicle or requesting a smart phone to play a particular song.

The performance of a speech recognition system is usually evaluated in terms of accuracy and speed. Therefore, regardless of the application, a goal of any speech recognition system is to accurately and efficiently convert speech into actionable commands or readable text.

SUMMARY

Embodiments of the invention provide techniques for adaptation of a speech recognition system based on non-acoustic input.

For example, in one embodiment of the invention, a method comprises the following steps. A vicinity from which speech input to a speech recognition system originates is determined. Non-acoustic data from the vicinity of the speech is obtained using one or more non-acoustic sensors. A subject speaker is identified as the source of the speech input from the obtained non-acoustic data. One or more non-acoustic attributes of the subject speaker is analyzed. A speech recognition system is adjusted based on the one or more analyzed non-acoustic attributes.

In additional embodiments, an article of manufacture comprises a computer readable storage medium for storing computer readable program code, which, when executed, causes a computer to perform one or more of the above mentioned steps.

In further embodiments, an apparatus comprises a memory and a processor operatively coupled to the memory, and configured to perform one or more of the above mentioned steps.

These and other objects, features, and advantages of the present invention will become apparent from the following detailed description of illustrative embodiments thereof, which is to be read in connection with the accompanying drawings.

DETAILED DESCRIPTION

Figure 1:
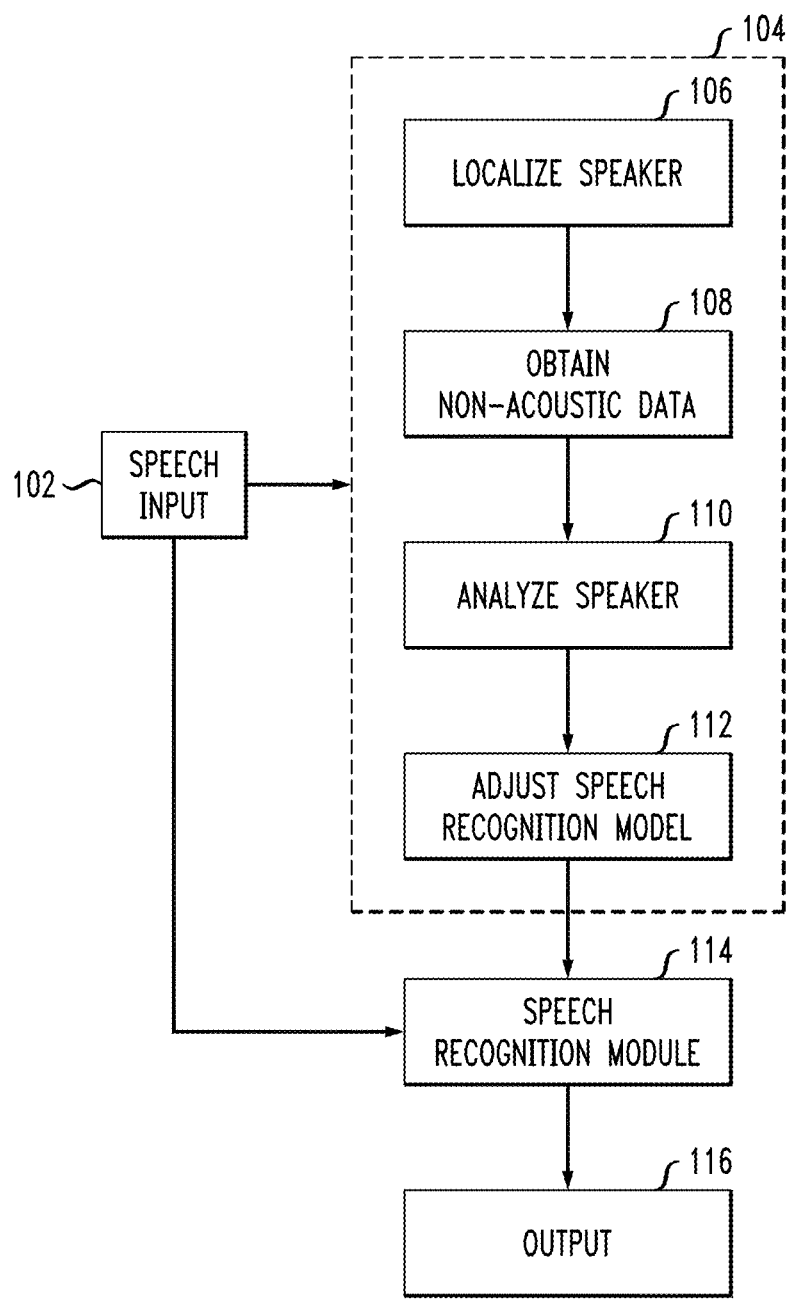
FIG. 1 depicts an overview of a speech recognition system according to an embodiment of the invention.

Illustrative embodiments of the invention may be described herein in the context of illustrative methods, systems and devices for speech recognition using non-acoustic sensors. However, it is to be understood that embodiments of the invention are not limited to the illustrative methods, systems and devices but instead are more broadly applicable to other suitable methods, systems and devices.

As used herein, non-acoustic input refers to information that is detected and captured in a modality other than an audio-only modality, for example, devices which detect and capture visual imagery such as, but not limited to, a camera, an infra-red sensor, a depth sensor (e.g., Microsoft Kinect™), or any suitable optical or imaging sensor.

When interacting with a speech recognition system, it could be frustrating for a user if his/her first few utterances are rejected or misunderstood. Therefore, it would be desirable for a speech recognition system to be capable of switching from a speaker-independent (designed to operate for any speaker) mode to a speaker-dependent (tailored to recognize a particular speaker's speech) mode as quickly as possible in order to achieve the highest accuracy, i.e., for the speech recognition system to be capable of rapid adaptation. Rapid adaptation is especially useful in scenarios where the speaker can change often or quickly, such as at information kiosks or with robotic-based applications.

One conventional form of speaker adaptation is a feature space transform to warp the perceived acoustic features closer to those of a canonical speaker. However, since this method depends on a moderately large and phonetically diverse sample of speech, it is slow to adapt to a new speaker. Moreover, it requires accurate transcription of at least some fragments of the speech sample, which can be problematic to obtain with an initial speaker-independent model.

Another conventional method is to have voice recognition models for several users as well as associated acoustic speaker identification models. Then, based on accumulated voice characteristics, a tentative speaker identification is made and the appropriate speaker-dependent recognition model is swapped in. However, speaker identification needs around thirty seconds of speech to operate, so this method cannot adapt quickly. Moreover, speaker identification based on acoustic information is only moderately accurate.

A weaker form of speaker adaptation is Vocal Tract Length Normalization (VTLN) which attempts to scale the frequencies of the speech signal based on the inferred anatomy of the speaker (e.g., male, female, child). As with other acoustic methods, a certain amount of speech data must be collected (e.g., voiced segments) before a reliable adjustment can be made. Thus, there is an unavoidable delay in adaptation using this method.

Advantageously, embodiments of the invention use one or more non-acoustic sensors to determine properties of a human speaker in order to rapidly adjust parameters of the speech recognition system. Since non-acoustic sensors (e.g., cameras) are usually directional, they are preferably aimed (at least approximately) at the user so as to provide useful analysis.

Furthermore, embodiments of the invention have various advantages over traditional acoustic methods of speech recognition. First, embodiments of the invention can be very fast (e.g., face recognition from a single image) and conceivably operate even before the first utterance is spoken. Second, embodiments of the invention can be more accurate because a higher bandwidth signal (e.g., color video) provides more information than the conventional single channel of sound.

FIG. 1 shows a speech recognition system according to an embodiment of the invention. Speech recognition system 100 receives a speech input 102 for processing by a speech adaptation module 104. Speech adaptation module 104 is represented by the dashed-lined box in FIG. 1. Speech adaptation module 104 comprises localizing a speaker (of the speech input 102) at step 106, obtaining non-acoustic data using one or more non-acoustic sensors at step 108, analyzing the speaker at step 110 and adjusting the speech recognition model at step 112 based on the results of steps 106, 108 and 110. Details of the speech adaptation module 104 will be further described in the context of FIGS. 2 and 3 below. The speech input 102 is then processed by speech recognition module 114 based on the results of the speech adaptation module 104. The resulting words or phrases are then either interpreted as commands or transcribed as text for output on a device at step 116. A device may be a tablet, a smartphone, a laptop or any other suitable electronic or computing device. Alternative embodiments of the speech recognition system 100 may comprise more or less functionally equivalent modules. All modules can be integrated within a single system or within multiple systems which may be remotely located. It is to be understood that speech adaptation module 104 and speech recognition module 114 may be implemented using hardware, software or a combination of hardware and software running on one or more computing or other processing devices.

Figure 2:
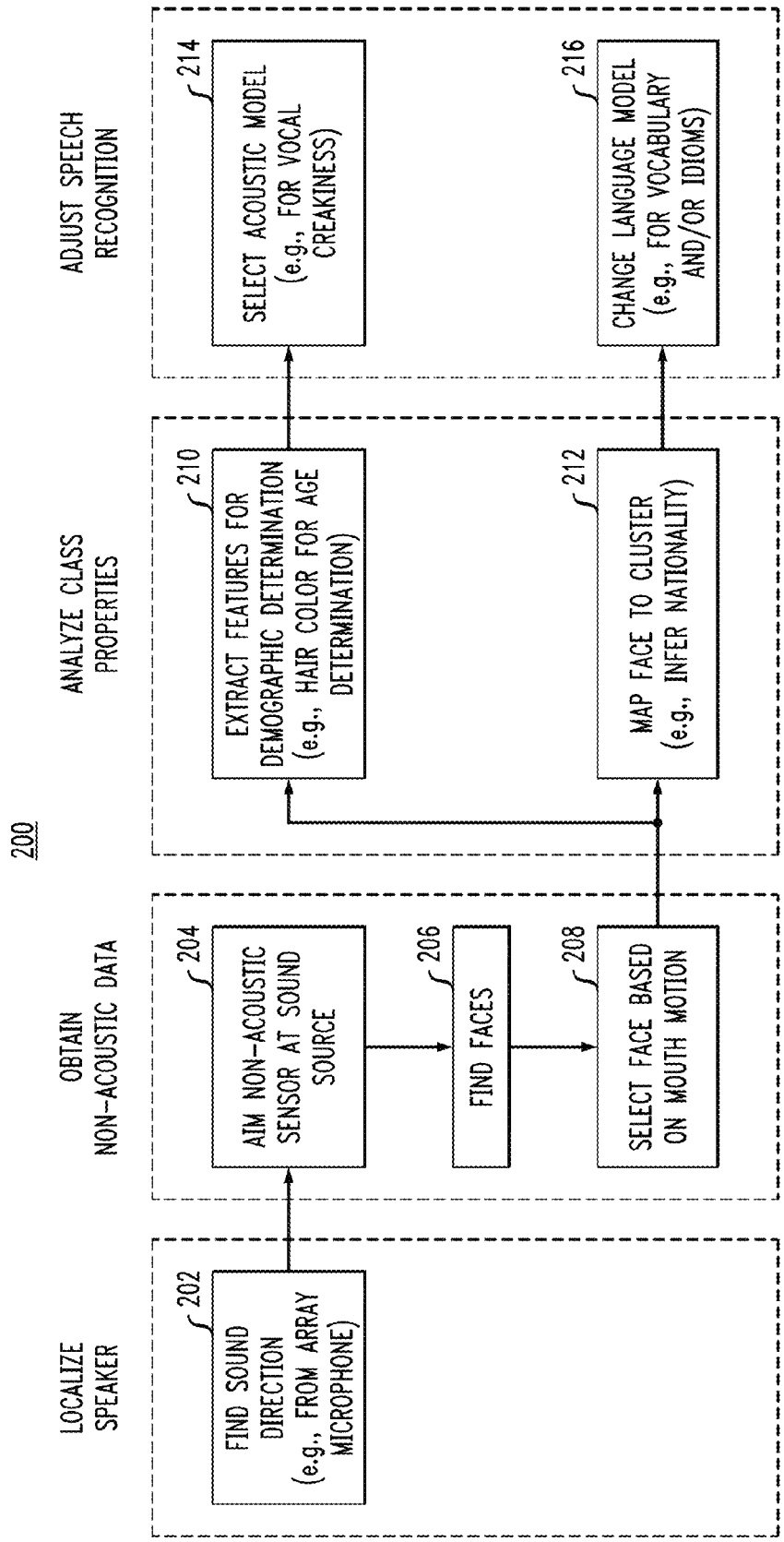
FIG. 2 depicts an illustrative speech adaptation module according to an embodiment of the invention.

FIG. 2 shows an illustrative embodiment of the speech adaptation module 104 of FIG. 1. Speech adaptation module 200 comprises localizing the speaker, obtaining non-acoustic data using one or more non-acoustic sensors, analyzing class properties of the speaker, and adjusting speech recognition based on the analyzed class properties (steps 106-112 of FIG. 1). In a typical scenario the human speaker can be located by a number of different techniques. Illustratively, at step 202, the speech adaptation module 200 locates the speaker by finding the sound direction of the speaker by determining a vicinity from which the speech input 102 originated. Finding the sound direction of the speaker may be performed with methods for estimating sound source direction, such as, but not limited to, beamformer based methods, time delay of arrival (TDOA) based methods, and spectrum estimation based methods. For example, an illustrative embodiment may use the beam angle from an array microphone to determine the dominant speaker. Alternatively, in a classroom setting, the speaker might be determined by looking for a raised hand in a camera image. Still another possibility would be to use a three-dimensional (3D) sensor, such as the Microsoft Kinect™ or a stereo vision system, to fit a human body model to depth data. The part of the body model corresponding to the head would then indicate the location of the speaker.

The speech adaptation module 200 then obtains non-acoustic data using one or more non-acoustic sensors (step 108 of FIG. 1) as follows. At step 204, one or more non-acoustic sensors, such as a pan-tilt-zoom (PTZ) camera, is aimed at the vicinity of the sound source based on the sound direction found in step 202. Additionally or alternatively, the vicinity of the sound source may be determined by locating one or more upper torso regions, particularly the head regions, using the one or more non-acoustic sensors. The one or more non-acoustic sensors then capture visual data (e.g., an image or video recording) of the vicinity of the sound source. It is to be appreciated that while one sensor (e.g., Kinect™ depth sensor) is used to locate the head region, another sensor may subsequently be used in obtaining non-acoustic data from the vicinity of the sound source (e.g., a color camera).

At step 206, the speech adaptation module 200 attempts to find faces that might correspond to the speaker using the captured visual data. An illustrative method of finding faces is to use a vision-based face finding algorithm (e.g., a Jones-Viola object detection framework using a Haar cascade) to find a likely human in the environment. Another illustrative method would be to look for flesh-tone ovals at appropriate places in the visual data captured by the one or more non-acoustic sensors.

At step 208, the speech adaptation module 200 may further select a face based on mouth motion. That is, the choice of a particular face as the speaker associated with the speech input could be made more plausible by looking for lip motion in the mouth region. If the face region has already been found, then the temporal differencing could be run on the lower third of the region. This compares the pixel intensities in an image acquired at one time instant to the corresponding pixel intensities in a second image acquired at a subsequent time. The system would count the number of pixels that had changed significantly and, if this count was above a threshold, decide that the mouth was in motion.

Next, the speech adaptation module 200 analyzes the identified speaker for class properties (step 110 of FIG. 1). Class properties may include, but are not limited to, attributes, characteristics and facial features of the identified speaker (e.g., age, gender, skin color, hair color and nationality). At step 210, appropriate features of the speaker (e.g., hair color and height of the identified speaker) are extracted for demographic determination. At step 212, the identified speaker's face is mapped to a cluster to infer characteristics of the speaker (e.g., nationality, gender). Speaker feature extraction and facial mapping may be performed using facial recognition algorithms and clustering algorithms.

Finally, the speech adaptation module 200 adjusts the speech recognition models (step 112 of FIG. 1) based on the analyzed class properties of the identified speaker. At step 214, the speech adaptation module 200 selects an acoustic model based on a demographic determined in step 210. For example, a model characterized by vocal creakiness may be selected based on a determination that the identified speaker is an elderly person. At step 216, a language model may be changed based on the nationality of the identified speaker determined at step 212. For example, if the speaker is identified as Chinese at step 212, an appropriate language model would be chosen to accommodate the vocabulary, word choices or dialect idioms specific to Asian speakers, thereby increasing accuracy of the speech recognition system. The acoustic model or language model may be selected from a library of acoustic models and language models maintained in a database. The database may be part of or separate from the speech recognition system 100 described herein.

Although FIG. 2 shows speaker features (step 210) being used to select an acoustic model (step 214), overall speaker features may also influence the choice of a language model (step 216). For instance, the age of a speaker might affect the likelihood of the phrase "groovy" being heard (people under 50 seldom use this). Similarly, facial clustering (step 212) might also be exploited to tune the acoustic model (step 214). Again, by example, the presence of dark hair and moderately dark skin might suggest a speaker from southern India and thus select an appropriate acoustic model to cope with the typical accent including the trilled "r" sound.

Once the speech adaptation module 104 adjusts the speech recognition model to be used by the speech recognition system 100, speech input 102 can be processed by speech recognition module 114 of FIG. 1 using the selected acoustic model and/or language model. The resulting words or phrases are then transcribed as text for output on a device at step 116 of FIG. 1 or interpreted as appropriate action commands for a robotic-based application.

In one embodiment of the speech recognition system 100 using the speech adaptation module 200, the non-acoustic sensor is a color pan-tilt-zoom (PTZ) camera. Orienting the color camera towards the speaker involves steering the PTZ camera to the correct pointing direction and setting a particular zoom factor. A similar conceptual orienting could also be performed without physical movement. For instance, the same camera might be used for both localizing and analyzing the speaker. For localization, a large image (e.g., 10M pixels) might be reduced in spatial resolution to speed up processing. Then, once a target location has been determined, a smaller region-of-interest (ROI) within this large image could be analyzed to determine characteristics of the speaker (e.g., the head region of the speaker).

There are a variety of features that might be generated to characterize the speaker and thereby influence the adaptation of the speech recognition system. For instance, there are broad demographic characteristics that can be derived from a face image. For example, the gender and approximate age of the speaker can be estimated based on their facial features (e.g., hair color), which could in turn quickly bootstrap the VTLN adaptation into the correct region. Illustratively, for a person determined to be elderly (e.g., based on hair color or presence of wrinkles), the use of a model characterized by vocal creakiness could be triggered for the speech recognition module. Similarly, ethnicity could also be estimated so as to adjust the speech recognition model to switch an Acoustic Model (AM) and Language Model (LM) to a particular class of speakers, such as Indian or Australian. As another example, interpreting the speech of children often requires special speech models, yet they can be distinguished from adults based solely on their measured height (no face images are needed).

Figure 3:
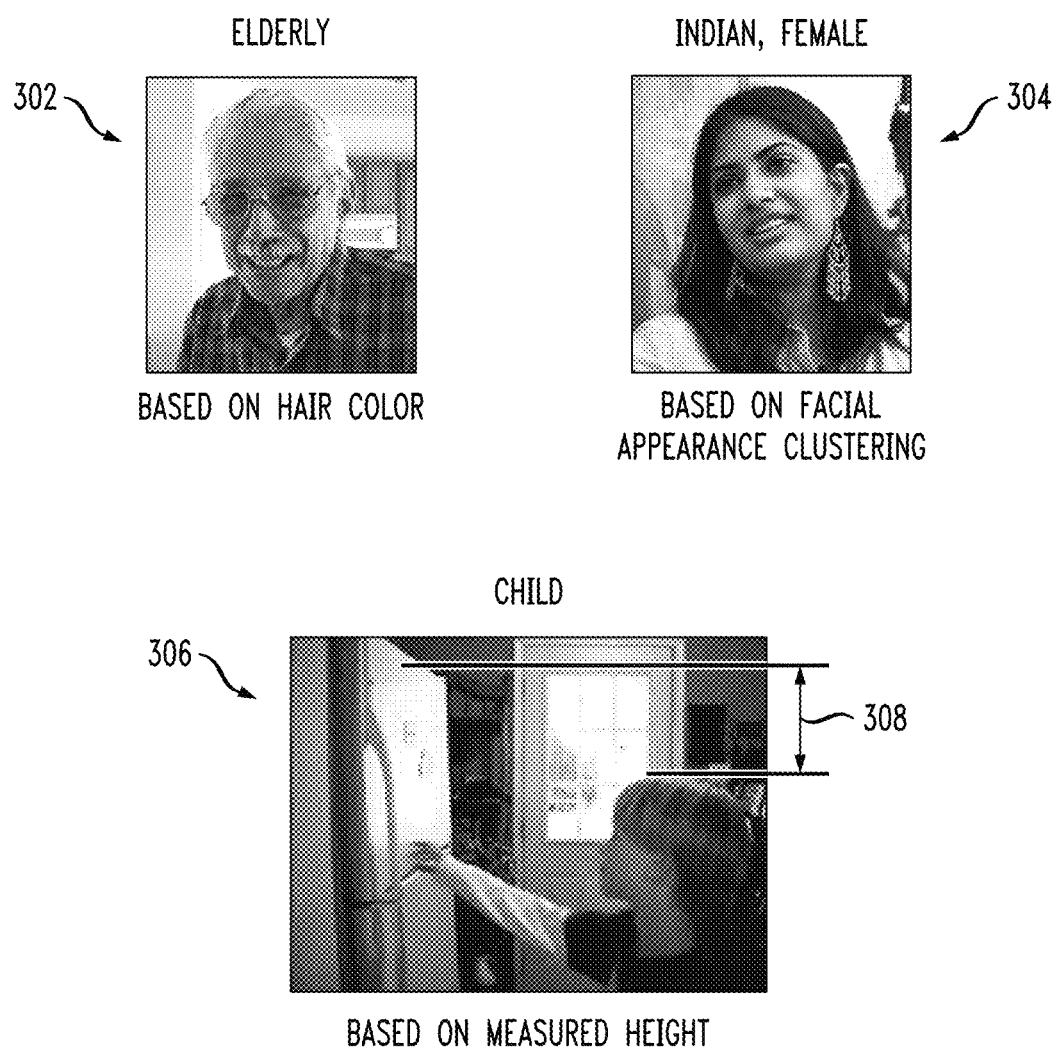
FIG. 3 depicts exemplary features extracted by the speech adaptation module of FIG. 2.

FIG. 3 shows exemplary features that could be extracted in illustrative applications of the speech adaptation module 200 of FIG. 2 above. For example, a vicinity from which the speech input originates is identified based on the sound direction analysis performed at step 202. Then, at step 204, a PTZ color camera is aimed at the identified vicinity and captures image 302. The speech adaptation module 200 then finds and selects the face of the identified speaker at steps 206 and 208. Next, based on the features extracted at step 210 (e.g., white hair color), the speaker is identified as an elderly person. At step 214, an acoustic model characterized by vocal creakiness can then be selected for use in the speech recognition module 114. Similarly, if the image captured was image 304, then based on facial appearance clustering (step 212 of FIG. 2), the speaker may be identified as an Indian female. At step 216, an appropriate language model may be selected to accommodate the word choices (e.g., British "lorry" instead of American "truck") and idioms specific to the dialect. As another example, if the image captured was image 306, then the speaker may be identified as a child based on the measured height indicated by arrow 308. An appropriate language model can then be selected to accommodate the high pitch and casual enunciation typical of a child. It is to be appreciated that such extraction can be done without first finding visual faces, e.g., by aiming a camera directly above the acoustically determined voice source and getting an average color. Similarly, as shown in FIG. 3 (308), age determination also does not necessarily require face finding, only determination of speaker height. In fact, if the speaker location is found via an acoustic device (e.g., array microphone), the z coordinate of this signal could be used to infer age.

It is to be noted that although the non-acoustic speaker information may be immediately perceptible, it may take some time to analyze it based on the available processing resources. For this reason, it may be advantageous to buffer the speech signal so that the system can be properly adapted before the first speech is sent for recognition. It is to be understood that one of ordinary skill in the art would appreciate the methods that may be used in buffering the speech signal without further elaboration.

Embodiments of the present invention may be a system, a method, and/or a computer program product. The computer program product may include a computer readable storage medium (or media) having computer readable program instructions thereon for causing a processor to carry out aspects of the present invention.

Figure 4:
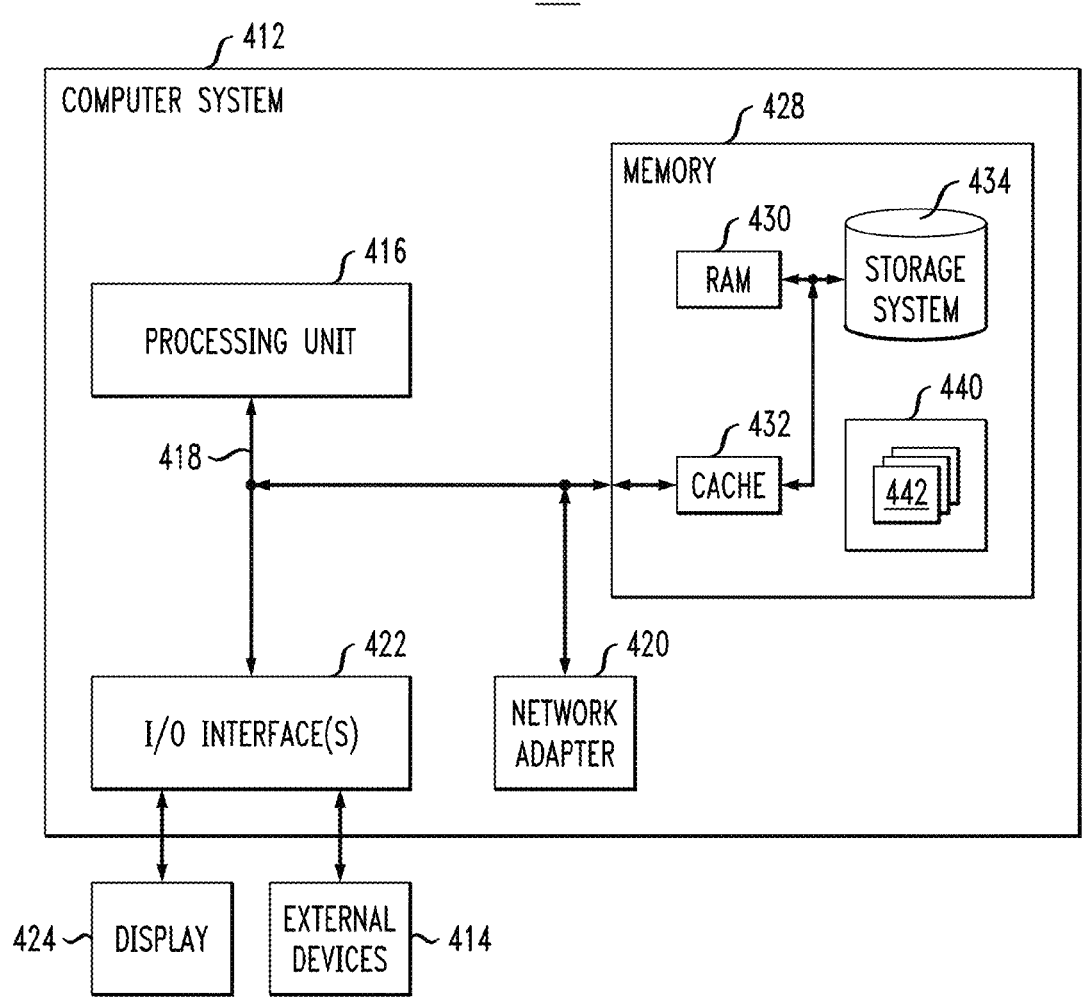
FIG. 4 depicts a computer system in accordance with which one or more components/steps of techniques of the invention may be implemented according to an embodiment of the invention.

Accordingly, the architecture shown in FIG. 4 may be used to implement the various components/steps shown and described above in the context of FIGS. 1-3.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 4, a schematic of an example of a cloud computing node is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

One or more embodiments can make use of software running on a general-purpose computer or workstation. In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:
1. A method, comprising the steps of:
   determining a vicinity from which speech input to a speech recognition system originates, wherein determining the vicinity comprises estimating a sound direction of a source of the speech input based on a signal processing method;
   obtaining non-acoustic data from the vicinity of the speech input using one or more non-acoustic sensors, wherein obtaining the non-acoustic data comprises capturing visual data of the vicinity of the speech input;

identifying a subject speaker as the source of the speech input from the obtained non-acoustic data, wherein identifying the subject speaker comprises:

segmenting one or more faces from the captured visual data;

detecting mouth motion on the one or more faces, wherein detecting the mouth motion comprises applying temporal differencing on each of the one or more faces by comparing a first pixel intensity associated at a first time with a second pixel intensity at a second time; and selecting a face corresponding to the subject speaker from the one or more faces in response to determining that a number of significantly changed pixels between the first pixel intensity and the second pixel intensity exceeds a threshold;

extracting one or more non-acoustic attributes associated with the subject speaker from the obtained non-acoustic data;

analyzing the one or more extracted non-acoustic attributes, and assigning at least one demographic to the subject speaker based on the analysis;

selecting at least one model for use by the speech recognition system based on the at least one demographic assigned to the subject speaker;

adjusting the speech recognition system using the at least one selected model; and processing the speech input using the adjusted speech recognition system;

wherein the steps are performed by at least one processor device coupled to a memory.

2. The method of claim 1, wherein the one or more non-acoustic attributes comprise hair color.

3. The method of claim 2, wherein assigning the at least one demographic to the subject speaker comprises assigning an age demographic to the subject speaker based on the analysis of the hair color.

4. The method of claim 1, wherein analyzing the extracted one or more non-acoustic attributes further comprises mapping the selected face to a cluster to infer one or more characteristics of the subject speaker.

5. The method of claim 4, wherein the cluster comprises at least one of a gender cluster and an ethnicity cluster.

6. The method of claim 1, wherein the one or more non-acoustic sensors comprise a camera.

7. The method of claim 6, wherein the camera is a pan-tilt-zoom (PTZ) camera.

8. The method of claim 1, wherein segmenting the one or more faces from the captured visual data comprises using at least one face finding algorithm to find one or more likely humans in the vicinity.

9. The method of claim 8, wherein the at least one face finding algorithm comprises a Jones-Viola object detection framework.

10. The method of claim 1, wherein the one or more non-acoustic attributes comprise a height associated with the subject speaker.

11. The method of claim 10, wherein assigning the at least one demographic to the subject speaker comprises assigning an age demographic to the subject speaker based on the analysis of the height.

12. The method of claim 1, wherein obtaining the non-acoustic data comprises locating one or more head regions using at least one of the one or more non-acoustic sensors.

13. The method of claim 1, wherein the one or more non-acoustic attributes comprise one or more facial features of the subject speaker extracted from the selected face.

14. The method of claim 1, wherein the at least one model comprises an acoustic model.

15. The method of claim 1, wherein the at least one model comprises a language model.

16. The method of claim 1, wherein the direction of the source of the speech input is estimated based on a beamformer based method.

17. The method of claim 1, wherein the direction of the source of the speech input is estimated based on a time delay of arrival based method.

18. The method of claim 1, wherein the direction of the source of the speech input is estimated based on a spectrum estimation based method.

19. The method of claim 1, wherein the one or more non-acoustic sensors comprise a three-dimensional depth sensor.

20. The method of claim 1, wherein detecting the mouth motion comprises applying the temporal differencing on a lower third of each of the one or more faces.

* * * * *